T. G. DADE.
WHEEL.
APPLICATION FILED DEC. 12, 1918.
1,386,164.
Patented Aug. 2, 1921.
2 SHEETS—SHEET 1.
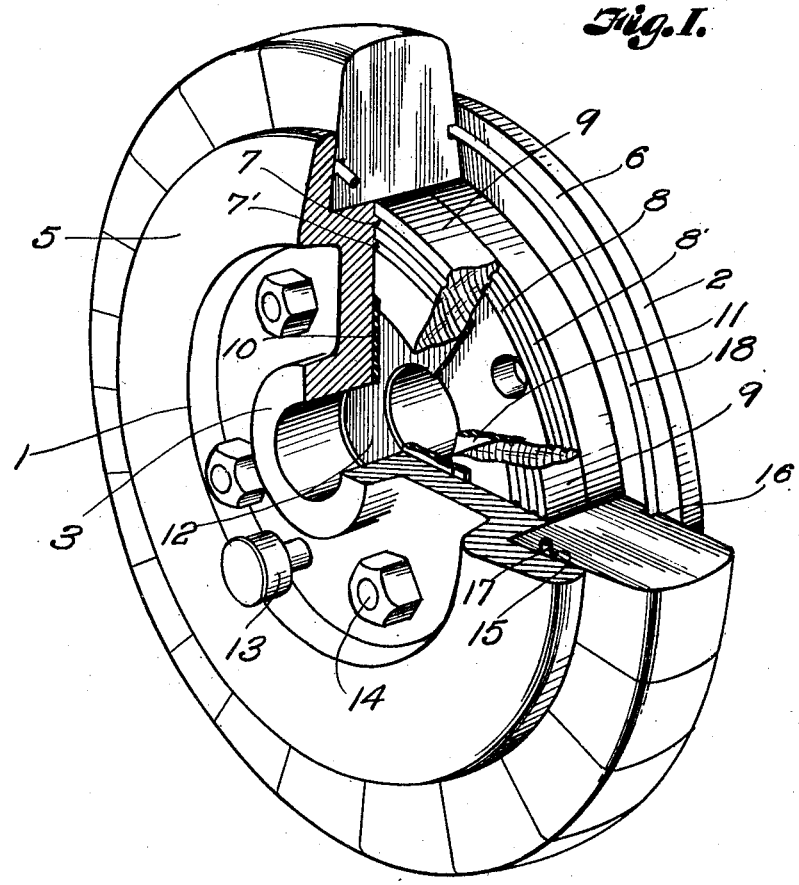
Fig. I.
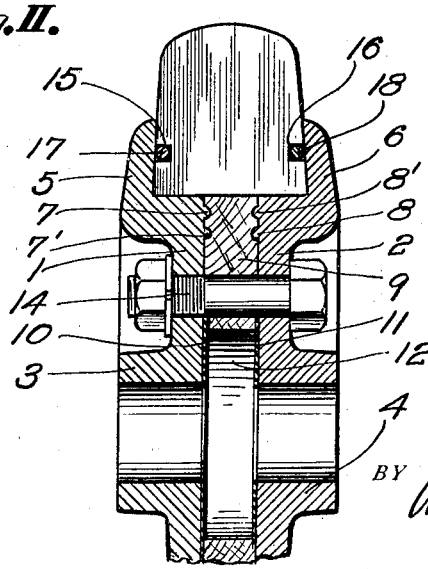
Fig. II.
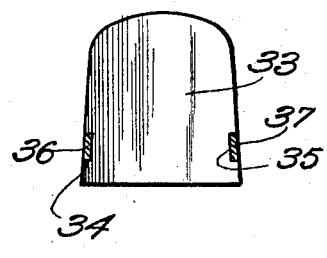
Fig. VI.
INVENTOR
Thomas G. Dade.
BY Arthur C. Brown
ATTORNEY

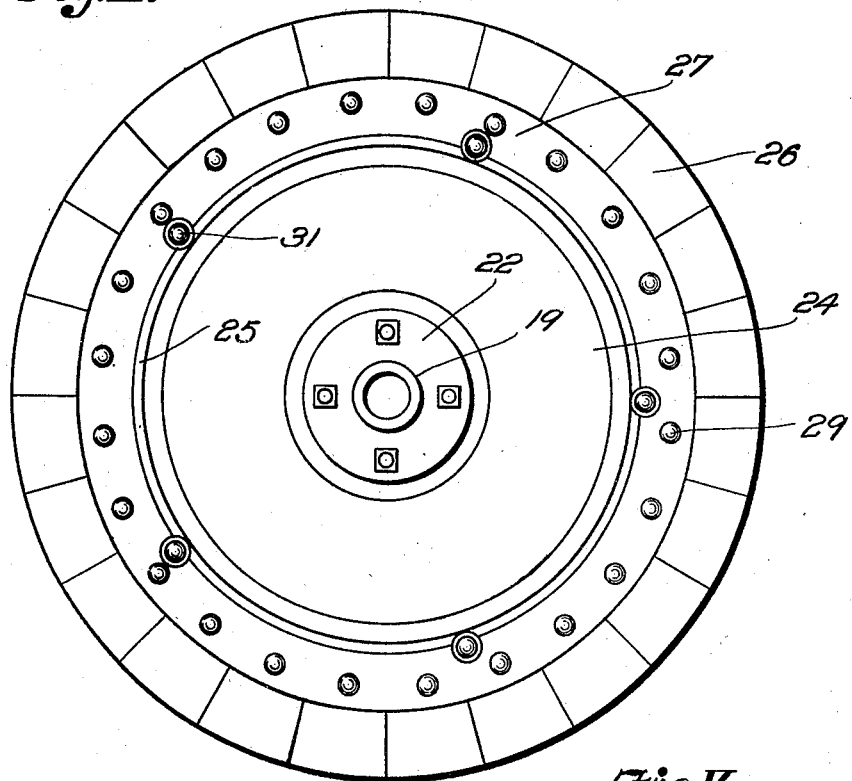
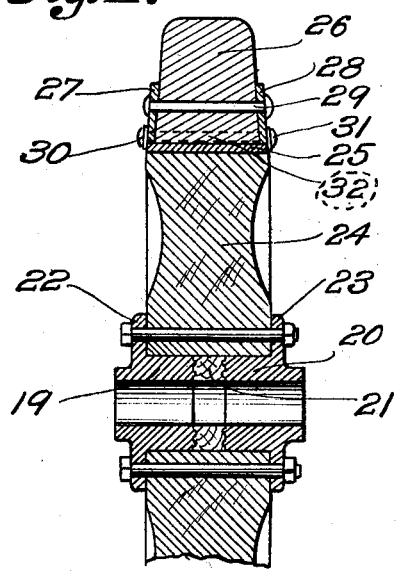
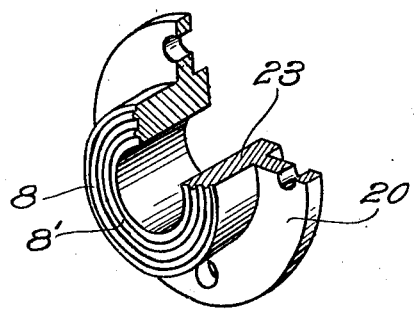

UNITED STATES PATENT OFFICE.

THOMAS G. DADE, OF SOUTH FORT SMITH, ARKANSAS.

WHEEL.

1,386,164.  Specification of Letters Patent.  Patented Aug. 2, 1921.

Application filed December 12, 1918. Serial No. 266,452.

*To all whom it may concern:*

Be it known that I, THOMAS G. DADE, a citizen of the United States, residing at South Fort Smith, in the county of Sebastian and State of Arkansas, have invented certain new and useful Improvements in Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to wheels and particularly to that class known as truck wheels.

One of the objects of the invention is to provide a wheel including a wooden tread or tire, the tire being so constructed that it may be easily attached to and detached from the wheel for inspection or repair.

In carrying out my invention, I prefer to construct a tire embodying the general characteristics of the tire described in my applications 141,309 and 257,904, but according to the present invention the tire may be constructed, ready to be applied and in condition to be shipped, to be substituted for a worn out tire, forming part of a previously used wheel.

I have also provided means whereby the webs, including the tire engaging flanges at the perimeter and the hubs may be standardized so that the same set of webs may be utilized in constructing wheels using tires of different widths. For example—for certain work, a wheel of a given diameter will require a tire with an inch or a one and a half inch tread, while other wheels of the same diameter may require a tire with a two and a half inch tread.

Ordinarily it has been the practice to keep on hand separate sets of patterns, one for each size of wheel, but according to my invention, one set of patterns may be employed to serve for all the wheels of a given diameter, even though the widths of the tires are variable. The variable requirements are taken care of generically by employing fillers or inserts of varying thicknesses to be disposed between the two halves or webs of the wheel. These fillers are so constructed that they serve a multiplicity of advantages. Not only do they properly space the halves or webs of the wheel proper distances apart, but they are so constructed that they have interlocking engagement with respective halves to prevent any radial or side-wise movement of one half of the wheel with respect to the other.

Another important advantage is that the fillers act as packings, whereby the danger of the lubricant usually employed for the bearings of wheels, will be prevented from leaking around the periphery of the wheel, with its attendant disadvantages.

Other objects and advantages of the invention will be specifically described hereinafter, it being understood that forms, operation and minor details of construction may be resorted to without departing from the spirit of the invention or sacrificing any of its advantages.

In the drawings:

Figure I is a fragmentary perspective view of a wheel constructed in accordance with my invention.

Fig. II is a fragmentary, cross-sectional view through a portion of a wheel constructed in accordance with my invention.

Fig. III is a side elevational view of a completed wheel embodying a modified construction.

Fig. IV is a cross-sectional view through a slightly modified form of wheel.

Fig. V is a fragmentary view of the hub section for the modified form of the wheel, and Fig. VI is a detail view of one of the wheel tire blocks.

In carrying out my invention, I prefer to construct a wheel of two side members 1 and 2, which I will hereinafter designate the disk members, because they have the general characteristics of a disk, provided with central, upwardly disposed hub flanges 3 and 4 respectively and peripheral radial inwardly inclined tire or rim embracing flanges 5 and 6, one for each disk. The inner faces of the respective disks are provided with annular ribs 7 and 7', 8 and 8', adapted to interlock with the filler or spacing ring 9, between which and the inner side faces of the disks are provided lubricant distributing wicks 10 and 11, which supply lubricant to the bearings; the lubricant being adapted to be introduced into the grease space 12, through the filler 13. The disks and filler may be rigidly fastened together by a series of bolts 14, which are interchangeable with shorter or longer bolts, according to the variation in the distance that the disks are spaced apart to accommodate the particular size of tread to be carried by specified diameter wheel.

From the description thus far it will be apparent that if the tire is to be of a different width, it is only necessary to take out the existing bolts and fillers and substitute others which will properly space the embracing flanges 5 and 6 to take care of the tire to be employed. It is also sometimes necessary to change the size of the hub so that in actual practice, the patterns which are used in the foundry for the manufacture of the two disks of the wheel have no hub projections but a particular hub section is attached to the pattern to make any length or size of hub, this being accomplished by merely changing the hub section of the pattern.

I am aware that this is not a new practice and the application of such patterns is simply mentioned here as explanatory of what I consider a convenient way of carrying out certain phases of my invention.

The tire or rim is adapted to be constructed of a plurality of blocks so cut and shaped that when assembled and finished, they form a ring that may be applied to a major portion of the wheel to form a tread therefor, and they may be treated prior to their application to the wheel form in a manner specifically set forth in my application 141,309.

As described in the said application, the blocks are cut in segments and assembled end to end preferably with the fiber running lengthwise to the blocks and slightly undercut so that the major portion of the end pressure is exercised against the shortest fiber in the blocks. Then these blocks are subjected to an even pressure about their periphery to form a ring. In addition to this, the blocks are scored or grooved segmentally so that continuous circular grooves 15 and 16 are provided in the sides of the ring thus formed, and into these grooves are received welded locking rings or bands 17 and 18. These bands so firmly lock the segments together after they are put under pressure that a truly detachable wood tire or rim is provided, which may be shipped to the customer for application to the wheel, which is an advantage over the present practice which requires that the wheel be shipped back to the factory each time that a new rim is to be applied.

It will be observed that the sides of the flanges 5 and 6 incline inwardly parallel with the sides of the blocks comprising the tire, so that the short fibers on the sides of the blocks will be protected against sloughing off, and that the filler between the disks will prevent pressure on the central portion of the blocks from causing the central fiber to be pushed away from those on the sides. In other words, the filler will act as a support, bridging the space between the two halves 1 and 2. The filler also serves the purpose of acting as a packing to prevent relative movement of one of the disks with respect to the other, because annular ribs on the respective disks become embedded into the respective sides of the filler when the two wheel members are drawn together by the bolts 14.

The ribs 7 and 7' and 8 and 8' also permit the halves to be drawn tight enough to cause a firm binding of the flanges 5 and 6 against the wheel rim or tire so that any liability of the tire becoming loose will be eliminated.

In Figs. 3, 4 and 5, I have shown a slightly modified form of ring, in which the two hub members 19 and 20 are provided with a packing filler 21, the hub members 19 and 20 being provided with flanges 22 and 23 to receive a wooden web portion 24, corresponding in a measure to the web portions on members 1 and 2.

In the form shown in Figs. 3, 4 and 5 the periphery of the wood portion 24 is provided with a perimetral band 25 extending entirely around the same, and upon which a ring, consisting of blocks 26 is secured, the blocks constituting the ring being held together by the side bands 27 and 28, connected by the bolts 29, the tire thus formed being attached to the wheel member by the overlapping heads 30 and 31 of the bolts 32. Generically, however, the wheel shown in Figs. 3, 4 and 5 approximates that shown in the preferred form.

In Fig. 6, I have shown the blocks 33 provided with grooves 34 and 35 in their respective sides to receive flat bands 36 and 37 instead of the rings 15 and 16 shown in Fig. 2. In other respects the tire would be substantially that shown in the preferred form.

While I prefer to construct the portion 24 of the wheels shown in Figs. 3 to 5 of wood, I may utilize metal and therefore do not wish to be limited to the use of wood in this form where the other novel features are employed.

It is also obvious that the sides of the portion 24 may be flat, convex or concave without departing from the spirit of the invention.

What I claim and desire to secure by Letters Patent is:

1. A wheel comprising two complementary disks consisting of hub, web and rim portions, the disks being provided with annular ribs on their inner faces, a packing ring between the disks and engaged by the ribs, fastening means for securing the disks in clamping relation with respect to the packing ring, and a tire carried by the rim.

2. A wheel comprising two complementary metallic disks including hub portions and rim portions connected by webs, annular ribs on the inner faces of the disks, a packing ring spacing the disks apart and engaged by the ribs, flexible ring spaced fabrics clamped between the sides of the disks and the packing ring, means for securing the disks together, and a tire carried by the disks.

3. A wheel comprising disk members provided with hub portions, web portions and tire-engaging rim portions, a spacing packing ring between the disks, flexible ring-shaped fabrics between the packing ring and the disks, means for maintaining the disks in clamping relation with the packing ring, and a tire caried by the disks.

In testimony whereof I affix my signature.

THOMAS G. DADE.